US010047609B2

(12) United States Patent
Hyatt et al.

(10) Patent No.: US 10,047,609 B2
(45) Date of Patent: Aug. 14, 2018

(54) AIRFOIL ARRAY WITH AIRFOILS THAT DIFFER IN GEOMETRY ACCORDING TO GEOMETRY CLASSES

(71) Applicant: United Technologies Corporation, Hartford, CT (US)

(72) Inventors: Thomas B. Hyatt, Cromwell, CT (US); Carl Brian Klinetob, East Haddam, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 571 days.

(21) Appl. No.: 14/427,145

(22) PCT Filed: Feb. 22, 2013

(86) PCT No.: PCT/US2013/027281
§ 371 (c)(1),
(2) Date: Mar. 10, 2015

(87) PCT Pub. No.: WO2014/051670
PCT Pub. Date: Apr. 3, 2014

(65) Prior Publication Data
US 2015/0226067 A1    Aug. 13, 2015

Related U.S. Application Data

(60) Provisional application No. 61/705,424, filed on Sep. 25, 2012.

(51) Int. Cl.
*F01D 5/14*     (2006.01)
*B23P 15/04*    (2006.01)
(Continued)

(52) U.S. Cl.
CPC ............ *F01D 5/141* (2013.01); *B23P 15/04* (2013.01); *F01D 5/147* (2013.01); *F01D 5/18* (2013.01);
(Continued)

(58) Field of Classification Search
CPC . F01D 5/141; F01D 9/041; F01D 5/28; F01D 5/18; F01D 5/147; B23P 15/04; B23P 15/02; F05D 2230/64
See application file for complete search history.

(56) References Cited

U.S. PATENT DOCUMENTS 3,606,580 A * 9/1971 Kaufman ............... B21H 7/16
416/232
5,269,058 A * 12/1993 Wiggs ............... B21D 26/055
228/157
(Continued)

FOREIGN PATENT DOCUMENTS

DE    102007027367    12/2007
EP    1544414    6/2005
(Continued)

OTHER PUBLICATIONS

STIC search report, generated 2017.*
(Continued)

*Primary Examiner* — Eldon Brockman
(74) *Attorney, Agent, or Firm* — Carlson, Gaskey & Olds, P.C.

(57) ABSTRACT

An airfoil array includes a plurality of airfoils that differ in geometry over a plurality of geometry classes. An airfoil can include an airfoil body that has a first distinct piece and a second distinct piece that seats together with the first distinct piece. The first distinct piece and the second distinct piece include a mistake-proof feature configured such that the second distinct piece fully seats with the first distinct piece.

16 Claims, 3 Drawing Sheets

(51) Int. Cl.
*F01D 5/18* (2006.01)
*F01D 5/28* (2006.01)
*F01D 9/04* (2006.01)

(52) U.S. Cl.
CPC .............. *F01D 5/28* (2013.01); *F01D 9/041* (2013.01); *F05D 2230/64* (2013.01); *Y02T 50/672* (2013.01); *Y02T 50/673* (2013.01); *Y10T 29/49321* (2015.01)

(56) References Cited

U.S. PATENT DOCUMENTS

| | | | | |
|---|---|---|---|---|
| 6,212,771 | B1* | 4/2001 | Ellis | F24F 13/15 29/432.2 |
| 6,282,786 | B1* | 9/2001 | Evans | B29C 45/14467 29/889.72 |
| 6,471,482 | B2* | 10/2002 | Montgomery | F01D 5/10 416/203 |
| 7,021,899 | B2 | 4/2006 | Ferte et al. | |
| 7,140,841 | B2* | 11/2006 | Goetzfried | F01D 5/22 416/191 |
| 7,189,064 | B2 | 3/2007 | Helder | |
| 8,636,474 | B2* | 1/2014 | Evans | F01D 5/06 416/193 R |
| 9,228,444 | B2* | 1/2016 | Evans | F01D 5/225 |
| 2005/0254955 | A1* | 11/2005 | Helder | B23K 20/122 416/233 |
| 2010/0064516 | A1 | 3/2010 | Spracher et al. | |
| 2010/0098547 | A1 | 4/2010 | Hagan et al. | |
| 2010/0247322 | A1 | 6/2010 | Bochiechio | |
| 2010/0209235 | A1 | 8/2010 | Shim et al. | |
| 2011/0211943 | A1* | 9/2011 | Belbeck | F01D 11/12 415/182.1 |
| 2011/0211965 | A1* | 9/2011 | Deal | F01D 5/147 416/223 R |
| 2012/0082556 | A1 | 4/2012 | Macchia et al. | |
| 2012/0237351 | A1 | 9/2012 | Weisse | |
| 2014/0119894 | A1* | 5/2014 | Hensley | F01D 17/162 415/148 |

FOREIGN PATENT DOCUMENTS

| | | |
|---|---|---|
| EP | 1626161 | 2/2006 |
| EP | 2177716 | 4/2010 |
| FR | 2956875 | 9/2011 |
| WO | 2013147972 | 10/2013 |

OTHER PUBLICATIONS

Extended European Search Report for European Patent Application No. 13842504.6 completed Sep. 21, 2015.
International Preliminary Report on Patentability for PCT Application No. PCT/US2013/027281 dated Apr. 9, 2015.
International Search Report for PCT Application No. PCT/US2013/027281 completed Dec. 11, 2013.

* cited by examiner

AIRFOIL ARRAY WITH AIRFOILS THAT DIFFER IN GEOMETRY ACCORDING TO GEOMETRY CLASSES

CROSS REFERENCE TO RELATED APPLICATION

This application claims priority to U.S. Provisional Application No. 61/705,424, which was filed 25 Sep. 2012 and is incorporated herein by reference.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

SUMMARY

An airfoil array according to an exemplary aspect of the present disclosure includes a plurality of airfoils that differ in geometry according to a plurality of geometry classes. Each of the airfoils includes a first distinct piece and a second distinct piece that seats together with the first distinct piece. The first distinct piece and the second distinct piece differ in geometry according to the plurality of geometry classes.

In a further non-limiting embodiment of any of the foregoing examples, each first distinct piece and each second distinct piece include a class-dependent mistake-proof feature such that each second distinct piece fully seats together only with each first distinct piece of the same geometry class.

In a further non-limiting embodiment of any of the foregoing examples, the mistake-proof feature includes a notch on one of the first distinct piece or the second distinct piece and a projection on the other of the first distinct piece or the second distinct piece, and the location of the notch and the projection differ according to the plurality of geometry classes.

In a further non-limiting embodiment of any of the foregoing examples, one of the first distinct piece or the second distinct piece is a hollow body and the other is a cover bounding at least a portion of an interior of the hollow body.

In a further non-limiting embodiment of any of the foregoing examples, the interior is hollow.

In a further non-limiting embodiment of any of the foregoing examples, the first distinct piece and the second distinct piece are metallic.

In a further non-limiting embodiment of any of the foregoing examples, the first distinct piece and the second distinct piece include aluminum metal.

In a further non-limiting embodiment of any of the foregoing examples, the first distinct piece and the second distinct piece include a reinforced composite material.

In a further non-limiting embodiment of any of the foregoing examples, the airfoils are hollow.

In a further non-limiting embodiment of any of the foregoing examples, the plural airfoils are circumferentially arranged.

An airfoil according to an exemplary aspect of the present disclosure includes an airfoil body that has a first distinct piece and a second distinct piece that seats together with the first distinct piece. The first distinct piece and the second distinct piece include a mistake-proof feature configured such that the second distinct piece fully seats with the first distinct piece.

In a further non-limiting embodiment of any of the foregoing examples, the mistake-proof feature includes a notch on one of the first distinct piece or the second distinct piece and a projection on the other of the first distinct piece or the second distinct piece. The notch and the projection aligning when the second distinct piece fully seats with the first distinct piece.

In a further non-limiting embodiment of any of the foregoing examples, the airfoil body is hollow.

In a further non-limiting embodiment of any of the foregoing examples, one of the first distinct piece or the second distinct piece is a hollow body and the other is a cover bounding at least a portion of a hollow interior of the hollow body.

A method for facilitating proper assembly of airfoils in an airfoil array according to an exemplary aspect of the present disclosure includes providing a plurality of first distinct pieces and a plurality of second distinct pieces from which a plurality of airfoils that differ in geometry over a plurality of geometry classes can be assembled, where each piece includes a class-dependent mistake-proof feature, the class-dependent mistake-proof feature indicating whether ones of the first of the distinct pieces will fully seat together with respective ones of the second distinct pieces; selecting one of the first distinct pieces and one of the second distinct pieces which is adapted for seating together with the selected one of the first distinct pieces according to the class-dependent mistake-proof feature; and seating the selected one of the second distinct pieces against the selected one of the first distinct pieces In a further non-limiting embodiment of any of the foregoing examples, the mistake-proof feature includes a notch on one of the first distinct piece or the second distinct piece and a projection on the other of the first distinct piece or the second distinct piece, and the location of the notch and the projection differ according to the plurality of geometry classes.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
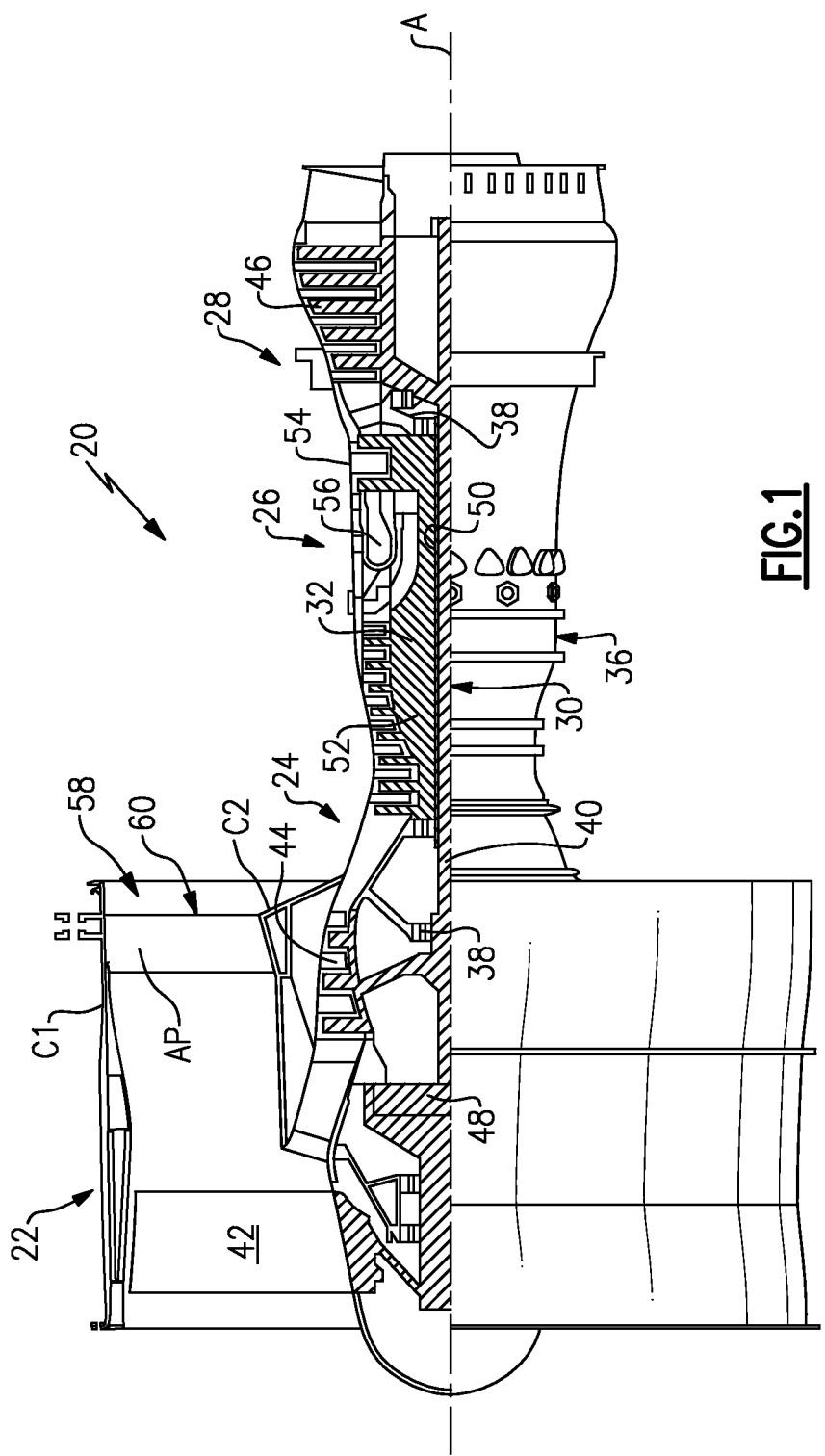
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it is to be understood that the concepts described herein are not limited to use with turbofans and the teachings may be applied to other types of turbine engines, including three-spool architectures and ground-based turbine that do not have a fan section.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°R)/(518.7°R)]^{0.5}$. The "Low corrected fan tip speed" as disclosed herein according to one non-limiting embodiment is less than about 1150 ft/second.

Figure 2:
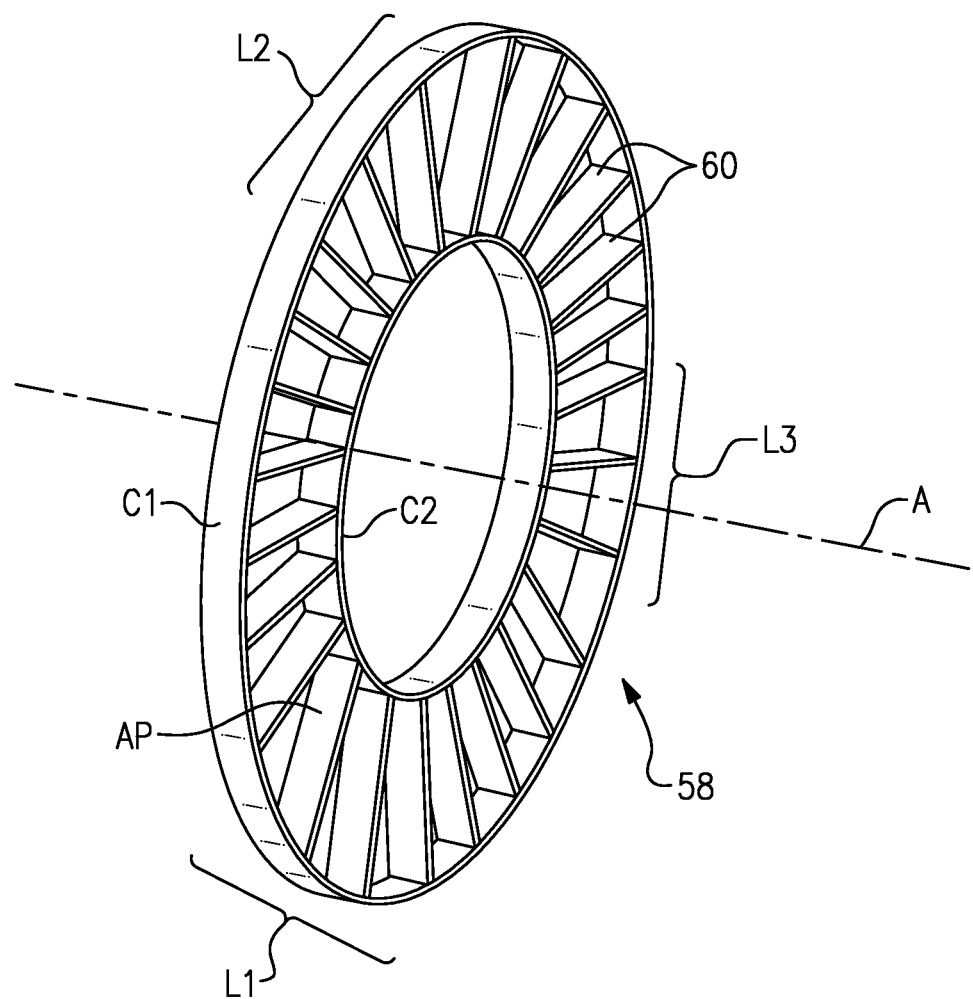
FIG. 2 illustrates a perspective, isolated view of an airfoil array.
Figure 3:
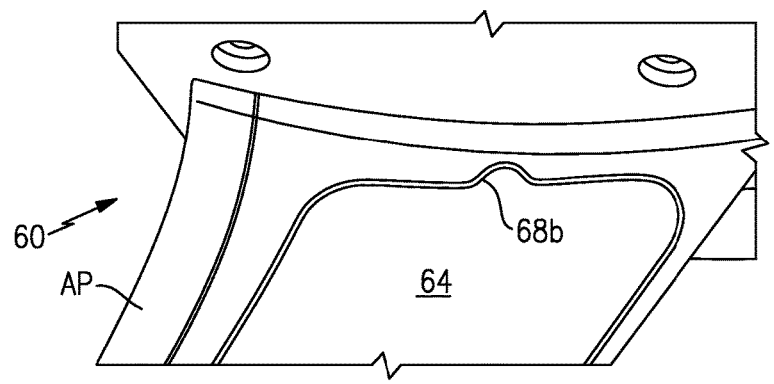
FIG. 3 illustrates a selected portion of an airfoil of the gas turbine engine of FIG. 1.

The engine 20 includes an airfoil array 58 that has a plurality of circumferentially-spaced vanes 60, as shown in the perspective, isolated view in FIG. 2. In this example, the vanes 60 are structural guide vanes. Although the examples herein will be described with reference to the vanes 60, it also contemplated that the examples can be extended to other circumferentially-spaced vanes or airfoils in the engine 20, such as compressor and turbine airfoils.

In the illustrated example, the vanes 60 extend between an outer case or panel C1 and an inner case or panel C2. To enhance aerodynamic performance, at least one of the vanes 60 differs in geometry from at least one other of the vanes 60. For example, each of the vanes 60 has an airfoil portion AP and the respective airfoil portions AP differ in geometry according to geometry classes. In one example, the geometry differences are variations in the aerodynamic contours of the airfoil portions AP among the geometry classes. In a further example, the geometry differences are subtle such that an observer may have difficulty visually distinguishing vanes 60 of different geometry classes.

The variations in the aerodynamic contours can be used to provide enhanced aerodynamic performance for aerodynamic conditions at a given circumferential location. In this example, vanes at location L1 have different geometry than vanes 60 at location L2, and the vanes 60 in locations L1 and L2 have different geometry than vanes 60 at location L3. The locations L1/L2/L3 are for example only and can differ by engine design or other factors. As can be further appreciated, the vanes 60 can alternatively differ in contouring of other aerodynamic surfaces or other geometric aspects according to geometry classes and this disclosure is not limited to variations in airfoil geometry.

In further examples, with reference to selected portions of representative vanes 60 shown in FIGS. 3-7, each of the vanes 60 is hollow. Alternatively, the vanes 60 can be solid or have a ribbed interior and internal cooling passages, depending on the design requirements and function of the vane 60 in a particular application. For structural guide vanes, and possibly other types of airfoils, the vanes 60 can be hollow to reduce weight, for example.

In the illustrated example, each of the vanes 60 includes a hollow body 62 that bounds an interior cavity 64. A cover 66 is bonded to the hollow body 62 to close the interior cavity 64. The hollow body 62 and the cover 66 are distinct pieces that are initially separate and are then bonded together to form the vane 60. In one example, after the bonding, the hollow body 62 and the cover 66 remain distinct pieces that can be visually perceived with or without magnification.

In a further example, the hollow body 62 and cover 66 are metallic. For instance, the hollow body 62 and cover 66 are fabricated of aluminum or aluminum alloy. In other examples, the hollow body 62 and the cover can be fabricated of other materials, such as other metals or alloys, inorganic materials, reinforced polymeric composites, metal matrix composites or ceramic matrix composites, other reinforced composites or the like.

Because the vanes 60 have differing geometries with respect to the contours of the airfoil portions AP, at least the covers 66 of the vanes 60 can differ in geometry according to geometry class. Further, in one example, the covers 66 can visually appear to an observer to have approximately the same size and shape. There is thus the possibility during assembly of the vanes 60 that a hollow body 62 of one geometry class would be incorrectly paired for assembly with a mismatched cover 66 of another geometry class.

Figure 4:
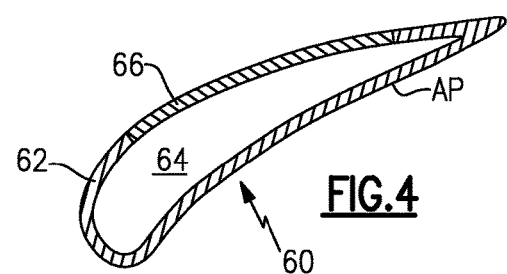
FIG. 4 illustrates a cross-section of the airfoil of FIG. 3.

To ensure that the hollow bodies 62 and covers 66 of the same geometry class are properly matched and assembled, the hollow bodies 62 and covers 66 include a class-dependent mistake-proof feature 68. The mistake-proof feature 68 differs according to geometry class such that a cover 66 of one geometry class cannot fully seat with a hollow body 62 of a different geometry class. In one example, a cover 66 of one geometry class fully seats only with a hollow body 62 of the same geometry class to thereby avoid assembly errors. As a further example, a fully seated cover 66 sits flush with its corresponding hollow body 62 of the same class, with respect to the exterior surface of the vane 60, as depicted in FIG. 4. In comparison, an incompletely seated cover 66 would not sit flush if mismatched with a body 62 of a different geometry class and there would be a ledge at the exterior surface where the cover 66 sits above the hollow body 62.

As an example, the class-dependent mistake-proof feature 68 includes a projection 68a on the covers 66 and a notch 68b on the hollow bodies 62. As can be appreciated, in an alternative example the covers 66 can include the notches 68b and the hollow bodies can include the projections 68a. For a matched pair of a hollow body 62 and a cover 66 of the same geometry class, the projection 68a aligns and can be received into the notch 68b. For an unmatched pair of a hollow body 62 and a cover 66 of different geometry classes, the projection 68a does not align and cannot be received into the notch 68b.

Figures 5, 6, 7:
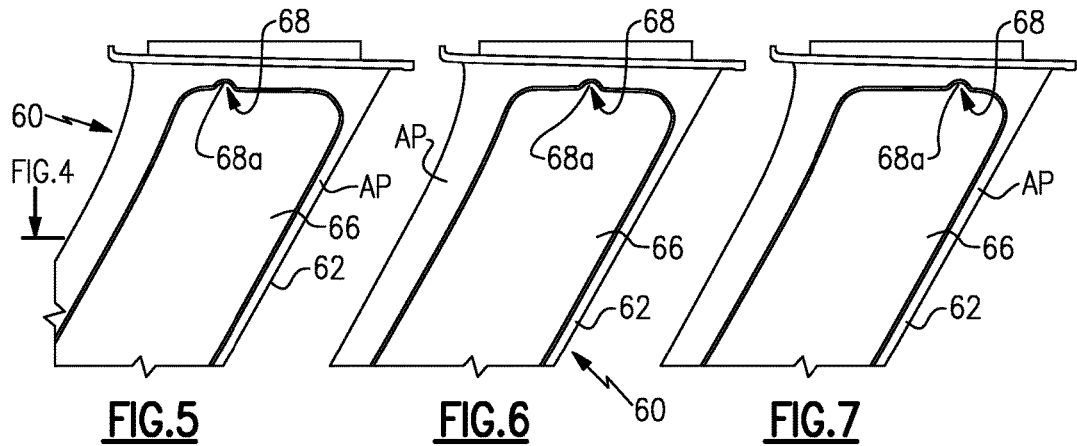
FIGS. 5-7 illustrate airfoils of a different geometry classes.

The locations of the projections 68a and notches 68b differ according to geometry class. For example, FIGS. 5-7 show locations for three different geometry classes. As a further example, the locations of the projections 68a and the notches 68b are visually distinguishable to an observer such that the observer can readily select a cover 66 that matches a hollow body 62 for assembly. It is to be understood that other locations can additionally or alternatively be used.

In FIG. 5, the mistake-proof feature 68 is located toward the top left side of the cover 66. In FIG. 6, the mistake-proof feature 68 is located toward the lateral center of the cover 66, and in FIG. 7 the mistake-proof feature 68 is located toward the top right side of the cover 66. Thus, in assembling a cover 66 to a hollow body 62, the projections 68a of each different geometry class will align only with the correspondingly located notch 68b of a hollow body 62 of the same geometry class. If an attempt is made to assemble a cover 66 to a mismatched hollow body 62 of a different geometry class, the projection 68a will not align with the notch 68b and the cover 66 will not fully seat in the hollow body 62.

The vane 60 also relates to a method for facilitating proper assembly of airfoils. As an example, the method includes providing the hollow bodies 62 and the covers 66 of the different geometry classes. A user, such as a person or a machine, then selects one of the hollow bodies 62 and one of the covers 66. The user then identifies the class-dependent mistake-proof feature 68 with respect to the selected one of the hollow bodies 62 and the selected one of the covers 66. The mistake-proof feature 68 indicates whether the selected cover 66 will fully seat together with the selected hollow body 62. In response to identifying that the selected cover 66 will fully seat with the selected hollow body 62, the hollow body 62 and the cover 66 are assembled together. In an instance where the selected cover 66 is a mismatch for the selected hollow body 62, there is a re-selection of a different cover 66 or a different hollow body 62. The user then again identifies the class-dependent mistake-proof feature 68 to determine whether there is a match. The re-selection step can be repeated until a match is found, however, if the mistake-proof feature 68 is visually perceptible to the user, as in the examples herein, the user may not have to re-select.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil array comprising:
    a plurality of airfoils, the airfoils circumferentially-spaced from each other, the airfoils having airfoil portions with aerodynamic contours that differ in geometry from airfoil-to-airfoil according to a plurality of geometry classes such that airfoils in one range of circumferential location are one of the geometry classes and airfoils in another range of circumferential location are of another of the geometry classes, each geometry class defining a different geometry of the aerodynamic contours, each of the airfoil portions including a first distinct piece and a second distinct piece seated with the first distinct piece to form the respective airfoil portion, wherein each first distinct piece and each second distinct piece include a class-dependent mistake-proof feature such that each second distinct piece fully seats together only with each first distinct piece of the same geometry class.

2. The airfoil array as recited in claim 1, wherein the mistake-proof feature includes a notch on one of the first distinct piece or the second distinct piece and a projection on the other of the first distinct piece or the second distinct piece, and the location of the notch and the projection differ according to the plurality of geometry classes.

3. The airfoil array as recited in claim 1, wherein one of the first distinct piece or the second distinct piece is a hollow body and the other is a cover bounding at least a portion of an interior of the hollow body.

4. The airfoil array as recited in claim 3, wherein the interior is hollow.

5. The airfoil array as recited in claim 1, wherein the first distinct piece and the second distinct piece are metallic.

6. The airfoil array as recited in claim 1, wherein the first distinct piece and the second distinct piece include aluminum metal.

7. The airfoil array as recited in claim 1, wherein the first distinct piece and the second distinct piece include a reinforced composite material.

8. The airfoil array as recited in claim 1, wherein the airfoils are hollow.

9. The airfoil array as recited in claim 1, wherein the first distinct pieces are hollow bodies and the second distinct pieces are covers, and the covers have the aerodynamic contours that differ in geometry from airfoil-to-airfoil according to the plurality of geometry classes.

10. The airfoil array as recited in claim 9, wherein each of the hollow bodies and each of the covers include the class-dependent mistake-proof feature.

11. The airfoil array as recited in claim 10, wherein the mistake-proof feature includes a notch and a projection.

12. The airfoil array as recited in claim 10, wherein the hollow bodies and the covers are metallic.

13. The airfoil array as recited in claim 10, wherein the hollow bodies and the covers include aluminum metal.

14. The airfoil array as recited in claim 10, wherein the hollow bodies and the covers include a reinforced composite material.

15. A method for facilitating proper assembly of airfoils in an airfoil array, the method comprising:
  (a) providing a plurality of first distinct pieces and a plurality of second distinct pieces, wherein the first distinct pieces and the second distinct pieces can be assembled into a circumferentially-spaced airfoil array, the airfoils having airfoil portions with aerodynamic contours that differ in geometry from airfoil-to-airfoil over a plurality of geometry classes, each geometry class defining a different geometry of the aerodynamic contours,
  wherein each piece includes a class-dependent mistake-proof feature, the class-dependent mistake-proof feature indicating whether ones of the first of the distinct pieces will fully seat together with respective ones of the second distinct pieces;
  (b) selecting one of the first distinct pieces and one of the second distinct pieces which is adapted for seating together with the selected one of the first distinct pieces according to the class-dependent mistake-proof feature; and
  (c) seating the selected one of the second distinct pieces against the selected one of the first distinct pieces.

16. The method as recited in claim 15, wherein the mistake-proof feature includes a notch on one of the first distinct piece or the second distinct piece and a projection on the other of the first distinct piece or the second distinct piece, and the location of the notch and the projection differ according to the plurality of geometry classes.

* * * * *